United States Patent
Groe

[15] 3,638,323
[45] Feb. 1, 1972

[54] MEASURING DEVICE
[72] Inventor: Robert O. Groe, 3328 N. Page St., Chicago, Ill. 60634
[22] Filed: Mar. 31, 1970
[21] Appl. No.: 5,779

[52] U.S. Cl. ..................................... 33/162, 308/DIG. 7
[51] Int. Cl. ..................................................... G01b 3/20
[58] Field of Search ............... 33/162, 143 J; 308/3 A, DIG. 7

[56] References Cited

UNITED STATES PATENTS

| | | | |
|---|---|---|---|
| 833,598 | 10/1906 | Hansen | 33/162 |
| 3,054,645 | 9/1962 | Evans | 308/3 A |
| 3,529,699 | 9/1970 | Smith | 33/162 X |
| 1,285,139 | 11/1918 | Hansen | 33/162 |
| 3,122,384 | 2/1964 | Luenberger | 308/DIG. 7 |
| 2,757,051 | 7/1956 | Wilmer et al. | 308/DIG. 7 |
| 2,452,804 | 11/1948 | Sulprizio | 308/3 A |

*Primary Examiner*—William D. Martin, Jr.
*Attorney*—John J. Kowalik

[57] ABSTRACT

A measuring instrument comprising a pair of triangular relatively suitable blocks having hypotenusal mating surfaces and parallel base surfaces, correlated registering measuring indicia on respective sides of the blocks, a tongue and groove interlock between said blocks, and a resilient deformable material such as nylon interposed between the tongue and groove releasably holding the parts in incrementally adjusted positions as the blocks are relatively moved along the mating surfaces, and a screw threaded through one block and engageable with the tongue on the other block for locking the blocks against accidental displacement.

9 Claims, 5 Drawing Figures

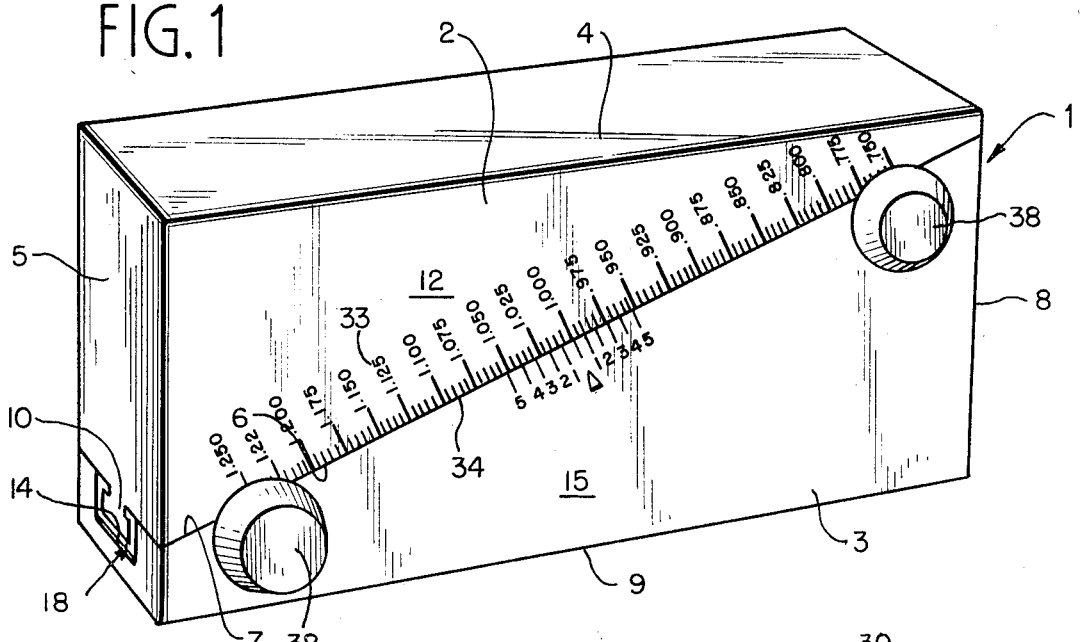
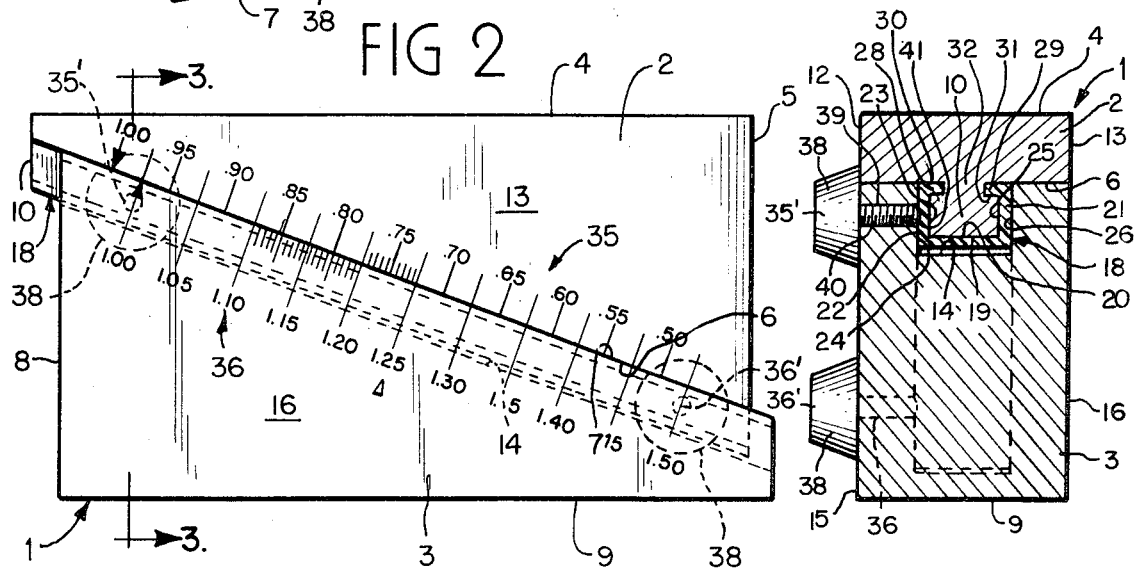
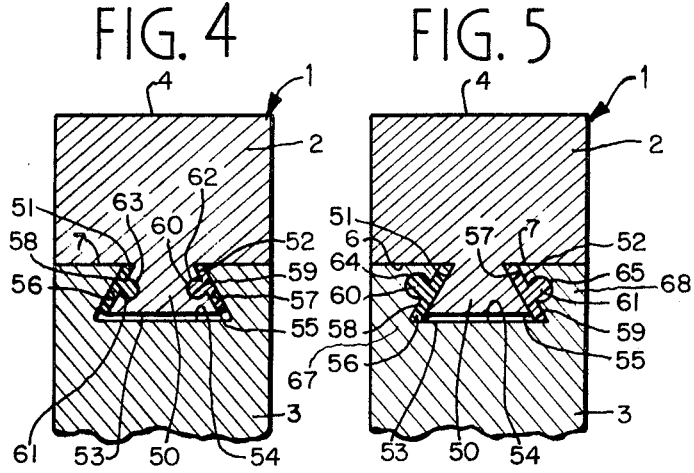
Inventor
Robert O. Groe
By John J. Kowalik
Attorney 3,638,323

MEASURING DEVICE

DISCUSSION OF THE PRIOR ART

Various forms of measuring blocks are known. However, they are difficult to adjust and hold in adjustment particularly in small increments. Furthermore applicant has no knowledge of anyone heretofore providing accurate measure of the adjustment in small increment and in different readily readable scales. Micrometer screw adjustment for such gauge blocks are not practical. Other devices known to applicant are expensive and delicate.

SUMMARY OF THE INVENTION

A general object of the invention is to provide a novel gauge block measuring instrument which is accurate and which may be minutely adjusted.

A further object is to provide novel means for interlocking the blocks and which may be easily adjusted.

Another object is to provide in a gauge block assembly comprising a pair of triangular blocks which mate along their hypotenusal edges, accurate indicia of different measuring systems and increments along such edges which are correlated to read against each other to obtain numerous adjustments.

A more specific object is to provide various means for interlocking the blocks in selected adjusted positions.

These and other objects and advantages inherent in an encompassed by the invention will become more apparent from the specifications and the drawings, wherein:

FIG. 1 is a perspective view of my novel gauge blocks;

FIG. 2 is a side elevation thereof;

FIG. 3 is a vertical sectional view taken substantially on the hill 3—3 of FIG. 2;

FIGS. 4 and 5 show different embodiments of the invention, the views being comparable to FIG. 3.

DESCRIPTION OF FIGS. 1–3

The gauge blocks assembly generally designated 1 comprises complementary top and bottom blocks triangular 2 and 3.

The top block has a flat top base side 4, a vertical side 5 and a bottom hypotenusal edge 6 which mates with a complimentary upper hypotenusal edge 7 of the bottom block 3.

The bottom block 3 has a vertical side 8 and a flat base bottom side 9.

The top block has a tongue or tenon 10 centered between the lateral sides 12, 13 and projects below the surface 6 and enters into a slot or mortise 14 which extends longitudinally of surface 7 which is centered between the lateral sides 15, and 16 of the bottom block.

A feature of the invention is the provision of a C-shaped plastic locking insert generally designated 18 which may be of nylon or any equivalent material.

The insert is yielding and serves to releasably interlock the top and bottom blocks and comprises a bottom web 19 which on its upper side bears against the bottom edge 20 of the tongue. A pair of integral upright webs 21, 22 extend upwardly from the lateral edges of the bottom web 19 and are compressed between the opposed sides 23, 24 and 25, 26 respectively, defining the sides of the tongue and slot.

The upper edges of the side webs 21, 22 are formed with inturned flanges 28, 29 which are entered into transverse slots 30, 31 in the tongue adjacent to its root portion 32.

Thus the insert is interlocked with the tongue and the lateral compression of the side webs of the insert between the tongue and the sidewalls of the slot hold the parts interlocked with each other in adjusted position as the blocks are manually shifted along their mating edges.

As best seen in FIGS. 1 and 2 the upper and lower blocks may be provided on their coplanar sides 12, 15 with, for example, a Vernier Scale 33 in increments of 0.005 inch and scale 34 with 0.001 inch and they may be arranged to read against each other as readily apparent, that is the indicia on one scale may read against any particular indicia on the other scale.

Similarly, on the sides 13, 16 the scales 35 and 36 as shown may be 0.500 inch to 1.50 inch in increments of 0.0025 inch.

After the blocks are adjusted at the desired spacing between the base surfaces 4 and 9, the parts may be fixedly locked by the screws 35', 36' each having a knurled head 38 for grasp by the thumb and forefinger of the user who turns the screw in threading the attached threaded shank 39 into the threaded portion 40 of the bottom block. The inner end 41 of the screw shank 39 deforms the adjacent portion of the side web 27 of the insert and tightly locks the parts together. Loosening of each screw permits other adjustment and since the plastic recovers its original shape, the depression formed in the plastic disappears and does not interfere with further incremental adjustment in close proximity to any instant previous adjustment.

DESCRIPTION OF FIG. 4

The structure of FIG. 4 is similar to that of FIGS. 1–3 and the same parts will be identified with the same reference numerals. The instant embodiment differs in the tongue and slot in that they are of dovetail construction, the tongue 50 being of trapezoidal form in transverse section and has a pair of upwardly converging sides 51, 52 and a flat bottom base 53 which is spaced upwardly from the bottom side 54 of the slot 55 in the bottom block.

The sides 56, 57 of the slot converge upwardly and the slot space and tongue are congruent.

The sides 51 and 52 are lined with flat strips 58, 59 of plastic such as nylon, strip 58 being compressed between surfaces 51, 56 and strip 59 being similarly transversely compressed between the surfaces 52, 57. This wedging and compression causes the upper and lower blocks to be drawn toward each other and held in engagement along their surfaces 6, 7. The plastic inserts 58, 59 may be provided on their back sides with any plurality of beads 60, 61 which may snap into complementary openings 62, 63 in the surfaces 51, 52.

DESCRIPTION OF FIG. 5

The structure of FIG. 5 is identical with that of FIG. 4 except that the apertures 64, 65 are in the side portions 67, 68 of the bottom block and receive the nibs 60, 61 of the strips 58, 59.

Thus in each embodiment, the blocks are held by the plastic strips in minute incremental adjustments and are locked by the setscrews as shown in FIG. 3. The parts are readily releasable for other adjustments and adapted to be quickly locked together.

I claim:

1. A measuring instrument comprising a pair of triangular gauge blocks having hypotenusal edges in sliding engagement with each other, interfitting tongue and groove means on said blocks spaced between said edges for guiding the blocks along their engaging edges, and deformable plastic insert means compressed between said interfitting means for taking up tolerances therebetween and effecting tight frictional engagement therebetween for holding said blocks in selected adjusted positions, and biasing the blocks to hold the edges engaged.

2. The invention according to claim 1 and said deformable means comprising plastic material.

3. The invention according to claim 2 and said material comprising nylon.

4. The invention according to claim 1 and said deformable means comprising plastic material compressed between the tongue and groove.

5. The invention according to claim 4 and said tongue having con converging lateral sides and said groove having similar sides and forming a dovetail interlock, and said material comprising nylon.

6. A measuring instrument comprising a pair of triangular gauge blocks having hypotenusal edges in sliding engagement with each other, interfitting tongue and groove means on said blocks for guiding the blocks for movement along their engaging edges, and deformable means interposed between said interfitting means in frictional engagement therewith for holding said blocks in selected adjusted positions, and each block having lateral sides, and registering measuring scales on each lateral side, and means for fixedly interlocking said blocks in adjusted positions and comprising a setscrew threaded in one of the blocks and reactive against the tongue on the other of the blocks.

7. The invention according to claim 5 and said lateral sides converging toward the root of the tongue, and said sides of the groove converging toward its open side.

8. The invention according to claim 7 and said plastic material lining opposite sides of the tongue and means interlocking the material with said sides of the tongue.

9. The invention according to claim 7 and said plastic material lining the sides of the groove, and means on the material and groove sides interlocking the material therein.

* * * * *